June 27, 1967 H. REICHERT 3,328,787

DEVICE FOR SECTOR SELECTION OF CYCLICALLY ADVANCED MEMORIES

Filed Aug. 26, 1963

3 Sheets-Sheet 1

INVENTOR
HUGO REICHERT
BY Toulmin & Toulmin
ATTORNEYS

INVENTOR
HUGO REICHERT
BY Toulmin & Toulmin
ATTORNEYS

INVENTOR
HUGO REICHERT
BY Toulmin & Toulmin
ATTORNEYS

United States Patent Office 3,328,787
Patented June 27, 1967

3,328,787

DEVICE FOR SECTOR SELECTION OF CYCLICALLY ADVANCED MEMORIES

Hugo Reichert, Wilhelmshaven, Germany, assignor to Olympia Werke AG, Wilhelmshaven, Germany Filed Aug. 26, 1963, Ser. No. 304,548
Claims priority, application Germany, Nov. 5, 1962, O 9,058
8 Claims. (Cl. 340—174.1)

The present invention relates to a device for selecting sectors from rotating or otherwise cyclically advancing memory type storage devices. More particularly, the invention relates to the selective control of read-in or read-out of "words" from an address sector of a rotating memory.

Memory devices in data processing systems often comprise rotating discs or drums divided into sectors, with each sector defining one "address" for storing a "word" defined by an encoded combination of "bits." The memory may be a temporary buffer or a permanent one. During operation it will be necessary to draw the "word" out of a particular address sector, or it is necessary to store a "word" into a particular address register. The invention is directed to a device performing such selecting control function.

It is known to associate the various zones on a magnetic storage carrier (tape, drum, or disc) to the zones of an input array in accordance with the cyclic passage of the storage zones under the scanning or read-in elements. Scanning, read-out, and evaluating processes of the content of a storage zone occurs simultaneously with the passage of this zone under the scanner head. The read-out selector of the input array, for example, comprises a cross bar distributor cooperating with a punched card. Column wires of the distributor connect to scanning contacts cooperating with a separate contact track on the memory drum. Each contact of this track is associated with a particular storage zone such as an address sector on the circumference of the drum, which storage zone then is operatively connected to the respective column scanner of the punched card. Additionally, an input device is required to now actually draw the intelligence content from the selected column of the punched card for storing in the zone. In such a device the input array, the column of the input devices and the drum zones are permanently associated which relationship cannot be altered. The evaluating device, reading-out the drum, thus has to correspond to the aforesaid read-in relationship. Additional storage and read-out not fitting into this pattern of relationship is not possible. Thus, the information content in the various address sectors or zones cannot be evaluated, erased or substituted outside of the fixed pattern.

Key boards are known to be destined to transfer letters or digits ("words") as magnetic bits onto a magnetizable drum. The drum is divided into address sectors, each serving as storage cell for a "word." A sector is selected in response to the position of a contact arm of a rotating selector switch. The angular contact arm position corresponds to the position of a sector in relation to the stationary read-in or read-out head thereof. Such transducer heads are enabled via the selector switch by stop and go pulses for read-in or read-out which pulses are drawn from a separate control track on the drum. The selector switch is step-actuated for sector selection of each read-in or read-out process. Again, there is a positive and unalterable association between the position of a "word," for example, to be read-in and the address sector into which it will be stored. Read-in must be had in a succession corresponding to the succession of sectors on the drum and the corresponding succession of contacts of the selector switch. Arbitrary sector selection for any purpose is not possible. After any read-in or read-out, the selector switch is returned to zero so that the next series of "words" find a similar succession of sectors.

It is furthermore known to select a sector on a magnetizable drum by means of a counter which is successively actuated by command pulses drawn from a command track. However, there again is a fixed association of read-in (or read-out) of several "words" and the address zones or sectors, and no arbitrary sector selection is possible.

It is an object of the present invention to provide for selection control of address sector read-out and/or read-in, entirely independent from the address sector arrangement on the memory device. In particular, it is an object of the invention to provide for memory read-in or read-out control of any desired address, independent from any succession of address read-out and read-in instructions.

It is another object of the present invention to call on a selected address sector of a memory drum for either read-in or read-out independent from any read-in or any read-out of any other address sector of the memory.

According to one aspect of the present invention in a preferred embodiment thereof, it is suggested to first provide an array of storage elements with one storage element being assigned to each address sector of a memory device. Each such storage element is individually energizable. There are further provided counting means or the like activatable like a shift register in synchronism with the passage of address sector junctions, each junction separating two adjoining address sectors. There are provided two "and" gates for each storage element and they are being enabled upon energization of the associated storage element. The two "and" gates have otherwise input terminals respectively connected to two succeeding counting stages. The "and" gates are divided into two groups and each group feeds one "or" circuit having as many input terminals accordingly. The groups are defined in such a manner that no two "and" gates of one group are connected to the same counter stage and to the same storage element. This way, one "or" circuit receives and transmits a pulse when the leading junction boarder of a selected address sector passes while the other "or" circuit receives and transmits a pulse when the trailing boarder junction of this address sector passes. By way of two master "and" gates, the two pulses thus appearing upon arbitrary selection of a particular address sector are used to first enable and later disable address sector read-in or read-out. Preferably, there are further provided main starting means to ensure that either read-in or read-out may occur only after a starting command pulse is being received.

While the specification concludes with claims particularly pointing out and distinctly claiming the subject matter which is regarded as the invention, it is believed that the invention, the objects, and features of the invention and further objects, features and advantages thereof will be better understood from the following description taken in connection with the accompanying drawing in which:

Figure 1:
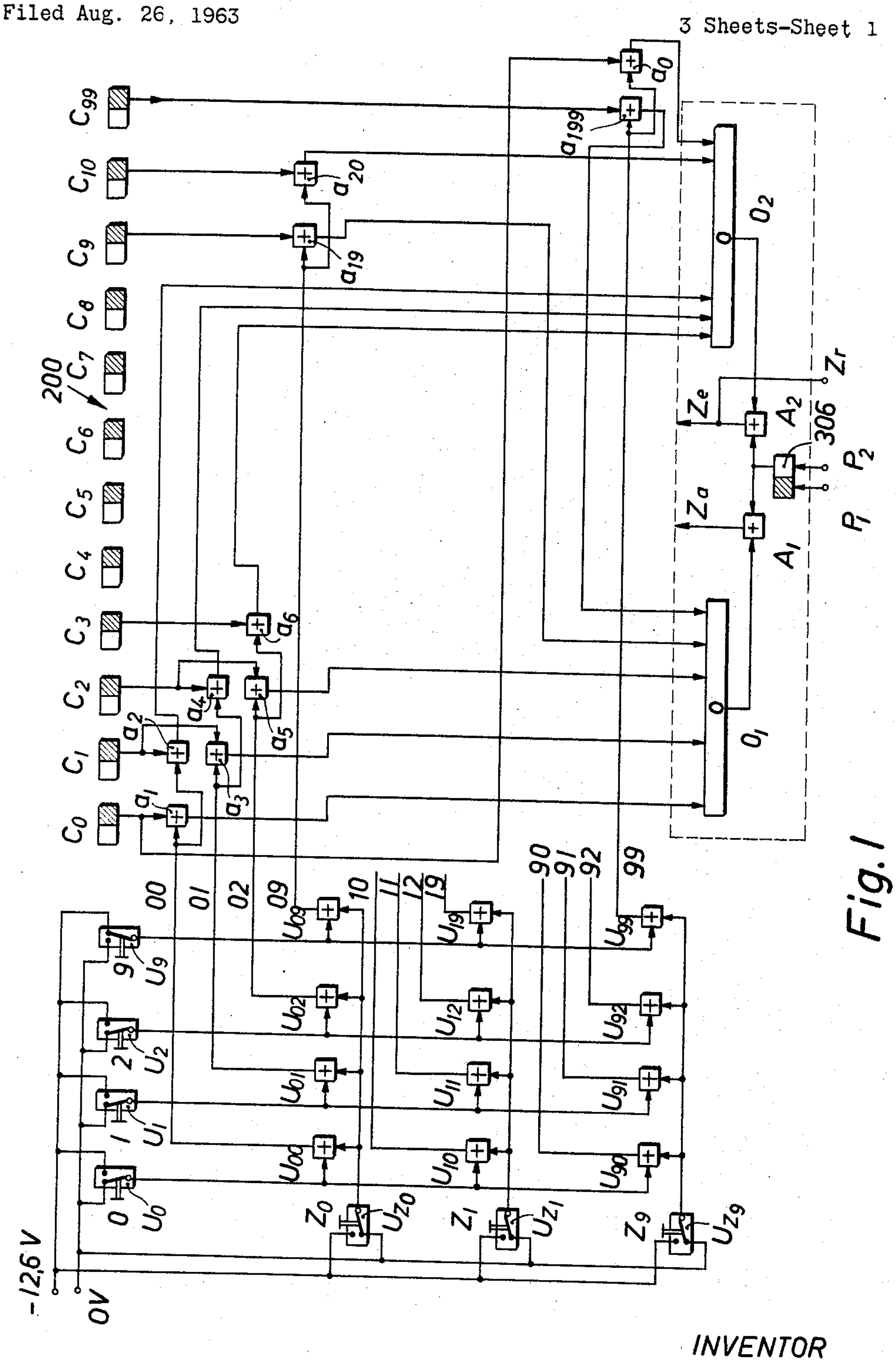
FIGURE 1 is a schematic wiring diagram of a first embodiment of an address sector selection circuit network according to the invention.

Proceeding now to the detailed description of the awing, in FIG. 1 thereof there are shown ten unit keys 1, 2 . . . 9 as well as ten tens-keys $Z_0$, $Z_1$, $Z_2$ . . . . Each of the unit keys actuates a switch respectively noted with reference character $U_0$, $U_1$, $U_2$ . . . $U_9$ iereas each tens-key actuates a switch, respectively de-ted with reference character $U_{z0}$, $U_{z1}$, $U_{z2}$ . . . $U_{z9}$. iere is a D.C. voltage source, the terminals of which e being denoted by reference potential values of 0 and 12, 6 in volts.

Each of the switches $U_0$ to $U_9$ governs a column wire which are connected ten input terminals of ten "and" tes, respectively, and each of the switches $U_{z0}$ to $U_{z9}$ is nnected to a line wire to which are connected ten input minals of ten "and" gates, respectively. There is an nd" gate located at each intersection of a line wire d of a column wire.

These "and" gates are denoted with reference char-ters $U_{00}$, $U_{01}$, $U_{10}$, $U_{99}$. There are thus altogether one indred such "and" gates, each having two input ter-inals respectively connected to one of said line wires, d one of said column wires. For example, switch $U_1$ verns one input terminal each of the "and" gates $U_{01}$, $U_{11}$, $U_{21}$ , $U_{31}$, $U_{41}$ . . . $U_{91}$. Switch $U_{z0}$ governs one put terminal each of the "and" gates $U_{00}$, $U_{01}$, $U_{02}$, $U_{03}$ . . . $U_{09}$ etc.

Each switch is connected to selectively apply either e of the said two voltage potentials to the input ter-inals of ten "and" gates. It is basically immaterial iich one of the two potentials represents the presence ) of an input signal and which one represents absence )) of an input signal. However, a key in resting posi-on applies (O), zero potential to the one input terminal all the ten "and" gates connected to the respective itch, whereas a pressed key applies operating (L) otential to such "and" gates.

It is thus apparent, that it requires activation of a y from the set of unit keys and activation of a key from e set of tens-keys to produce an output signal at that nd" gate, located at the matrix position as defined by e intersection of the line and column wires, respectively sociated with the two keys thus activated.

As will become more apparent below, the array or atrix of "and" gates $U_{ik}$ ($i$, $k$ being 0, 1 . . . 9) to-ther with the line and column wires with operating itches represent a buffer for an address code repre-nting address sectors of a memory device, with each ich "and" gate constituting an address buffer storage ll or storage element storing the address as single bit response to a code applied for selection to the corre-onding pair of column and line wires. In a way, the ibscripts of the letter U denoting the respective "and" ites can be regarded as representing the address in ecimal code. Energization of a particular pair of line id column wires thus selects a particular address indeed.

The output lines each of the address buffer "and" ites are denoted by their respective subscripts. There e thus one hundred "and" gate output lines 00, 01, 2 . . . 09, 10, 11 . . . 19 . . . 99. These lines con-itute address code buffer output channels. Each output ie connects to two input terminals respectively pertain-g to two address selection control "and" gates. There e thus two hundred such "and" gates donoted with $a_1$, $a_2$, $a_3$ . . . $a_{199}$, $a_0$.

Hence, upon energization of any address buffer "and" ite $U_{ik}$, there will be enabled or gated open as prepara-on two address selection control "and" gates $a_{2(10 \cdot i+k)+1}$ nd $a_{2(10 \cdot i+k)+2}$ with $i$ and $k$ being any integer from zero nine.

There is next provided a counting device generally de-oted with 200, having altogether one hundred counting ages $C_0$, $C_1$ . . . $C_{99}$. There are as many counting ages as there are address sector junction lines or board-ers along a track on a memory drum. Hence, instantly provision is made to accommodate one hundred sector junctions. Since the memory is to be a cyclic one, there are thus also one hundred address sectors.

The hundred counting stages $C_0$ to $C_{99}$ are only sche-matically illustrated with the symbol commonly used for bistable flip flops, and flip flops indeed will pref-erably be used. These flip flops are interconnected in a conventional manner to constitute a counter. Basically, the flip flops will be interconnected to form a counter of the shift register type capable of being shifted by count-ing clock pulses suitably applied.

As will be explained later with reference to FIG. 3, the counter pulses are drawn from a special track of the memory device representing the junctions and their position relative to the address sectors thereof. Counting stage $C_0$ is associated with the leading junction of the first sector, stage $C_1$ is associated with the trailing junc-tion of the first sector which is, of course, also the lead-ing junction of the second sector etc.

Counter and memory drum have to advance in synchro-nism so that the operating output terminals of the count-ing stages $C_i$ indicate the corresponding sector junctions on the drum as passing under the address content scanner for read-in or read-out. Each counting stage $C_i$ has an operating output terminal capacitively (or otherwise) con-nected to two input terminals respectively pertaining to two of the "and" gates $a_0$, $a_1$, $a_2$ . . . $a_{199}$.

Figure 2:
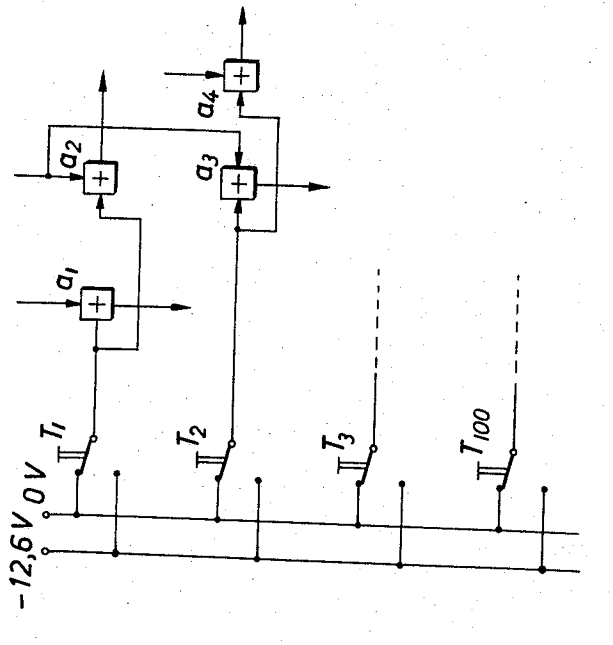
FIGURE 2 is a modified detail of FIG. 1.

The connection of stage $C_0$ to gates $a_0$ and $a_1$ is only symbolically shown in FIG. 1 and will be more fully ex-plained with reference to FIG. 2.

However, all of the other counting stages $C_1$ to $C_{99}$ are connected to the several "and" gates $a_2$ to $a_{199}$ in such a manner that a short pulse is applied to one input ter-minal, each of these two "and" gates connected to that counting stage is then triggered by the counting pulse.

Each of the address selection control gates $a_0$ to $a_{199}$ connects to one of the output lines 00 . . . 99 and to one counting stage, and an output is being produced upon coincidence of signals.

The pattern of connection is as follows:

Counting stage $C_0$ connects to $a_0$ and $a_1$
Counting stage $C_1$ connects to $a_2$ and $a_3$
Counting stage $C_2$ connects to $a_4$ and $a_5$
Counting stage $C_3$ connects to $a_6$ and $a_7$
(In general) $C_i$ connects to $a_{2i}$ and $a_{2i+1}$
Counting stage $C_{99}$ connects to $a_{198}$ and $a_{199}$
(with $i$ being any value from 0 to 99)
Line 00 connects to $a_1$ and $a_2$
Line 01 connects to $a_3$ and $a_4$
Line 09 connects to $a_{19}$ and $a_{20}$
Line 10 connects to $a_{21}$ and $a_{22}$
Line 11 connects to $a_{23}$ and $a_{24}$
Line 99 connects to $a_{199}$ and $a_0$ ($=a_{200}$)
(In general) $ik$ connects to $a_{2(10i+k)+1}$ and $a_{2(10i+k)+2}$
(with $i$ and $k$=any value from 0 to 9)

All address selection control "and" gates having odd subscripts form one group and are connected with their respective output terminals to input terminals of an "or" circuit $O_1$, whereas the "and" gates with even subscripts form a second group and are connected to an "or" circuit $O_2$.

As will become more apparent below, the address se-lection control "and" gates with odd subscripts respond to coincidence of a particular address selection and the passage of the leading boundary junction of the selected address sector under a memory input-output scanner. The address selection control "and" gates with even subscripts respond to coincidence of a particular address selection and the passage of the trailing boundary junction of the selected address sector under the memory input-output scanner.

Each junction is simultaneously the leading boundary of one address sector and the trailing boundary of the succeedingly adjoining address sector. There are thus two address selection control "and" gates associated with each junction, enabled by the same counter stage as stated but otherwise connected to two different address buffer "and" gates $U_{ik}$.

Upon selection of any one address, the address selection control "and" gate associated with the leading junction of that address sector feeds a pulse to "or" circuit $O_1$ when this leading junction has reached the memory input-output scanner, and the address selection control gate associated with the trailing junction of that same address sector feeds a pulse to "or" circuit $O_2$ after passage of the address sector.

The output of "or" circuit $O_1$ governs one input terminal of a master "and" gate $A_1$ whereas the output of "or" circuit $O_2$ governs one input terminal of a second master "and" gate $A_2$. The two other input terminals of master "and" gates $A_1$ and $A_2$ are interconnected and connect to the on-side of a flip flop 306 having two input terminals $P_1$ and $P_2$ for respectively turning flip flop 306 on and off. The formation of the trigger pulses applied to terminals $P_1$ and $P_2$ will be described below.

The output terminals of master "and" gates $A_1$ and $A_2$ respectively connect to terminals or terminal lines $Z_a$ and $Z_e$. The output pulses as they appear at terminals $Z_a$ and $Z_e$ respectively mark passage of the beginning and of the end of a selected address sector. In other words, a pulse at $Z_a$ marks the passage of a leading junction of a selected sector, whereas the next following pulse at $Z_e$ marks the passage of the trailing junction of the same selected address sector.

Figure 3:
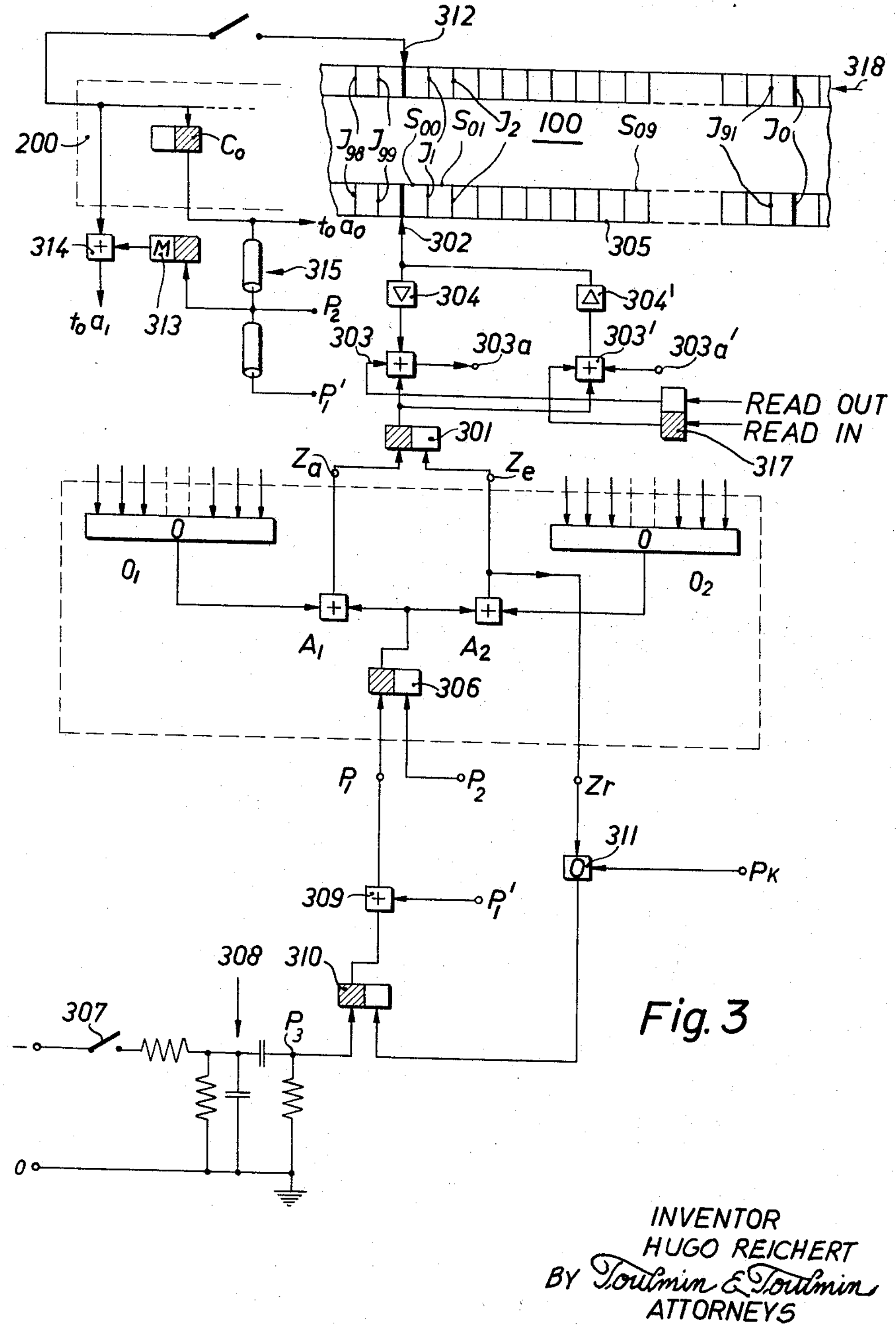
FIGURE 3 is a circuit digram supplementing the wiring diagram of FIG. 1 and showing the memory read-in and read-out control circuit operated in accordance with address sector selection.

Turning now to FIG. 3, there will be described how all these pulses are being produced. The networks of FIG. 2 and FIG. 3 are linked in that the elements outlined in the dotted rectangle in each figure enclose identical circuit elements.

Terminals $Z_a$ and $Z_e$ respectively constitute on-side and off-side input terminals of a flip flop 301, the on-side of which governs the gating terminal of a read-out control "and" gate 303 as well as the gating terminal of a read-in control "and" gate 303'. The main input terminal of "and" gate 303 is connected to the output side of an amplifier 304 to which is connected a scanning element 302 such as a transducer head. Thus, transducer head 302 cooperates with a memory track 305 on memory drum 100 shown partially in development.

It may be assumed that the memory drum 100 is provided with a magnetizable circumferential mantle so that element 302 constitutes a magnetic transducer head, for example, one which can serve for magnetic read-in as well as read-out.

A read-in control "and" gate 303' connects to an output amplifier 304' which is also connected to transducer head 302. This way, it is rather easy to control memory read-in as well as read-out with the same arrangement. Whether read-in or read-out is to be employed is selected by actuating a flip flop 317 having its two output terminals connected to respective second gating terminals of "out" gates 303 and 303'.

Scanner or transducer head 302 either reads-out the stored bits representing the "word" in an address sector, or it stores bits representing such "word" in an address sector. The special mode of read-in and read-out is not critical for the invention which is only concerned with address sector selection.

Terminals 303*a* and 303'*a* constitute main read-out and main read-in terminals. These terminals may, for example, be connected to a computing unit.

Track 305 is comprised of a plurality of succeeding address sectors $S_{00}$, $S_{01}$, $S_{02}$ . . . $S_{09}$ . . . $S_{99}$ and respectively adjoining sectors are separated by junctions $J_i$. For example, junction $J_0$ separates sectors $S_{99}$ and $S_{00}$, junction $J_1$ separates sectors $S_{00}$ and $S_{01}$, etc.

More particularly, junction $J_0$ is the trailing boundary for address sector $S_{99}$ and the leading boundary for address sector $S_{00}$ etc.

Gate 303 (or gate 303') is open for transmission a[nd] after occurrence of a "go" control pulse *za* at ter[minals] $Z_a$, and gate 303 (or 303') is closed with occur[rence] of a "stop" control pulse *ze* at $Z_e$. During this pe[riod] just one address sector is to pass beneath scannin[g] head 302 and the content of this address sector is bein[g] passed on through gate 303 (or 303').

In order to assure proper association of the passag[e] of address sectors and junctions under scanner 302, [a] junction track 318 is provided on drum 100 and scanne[d] by a read-out transducer head 312 delivering countin[g] pulses to the counter 200.

Figure 4:
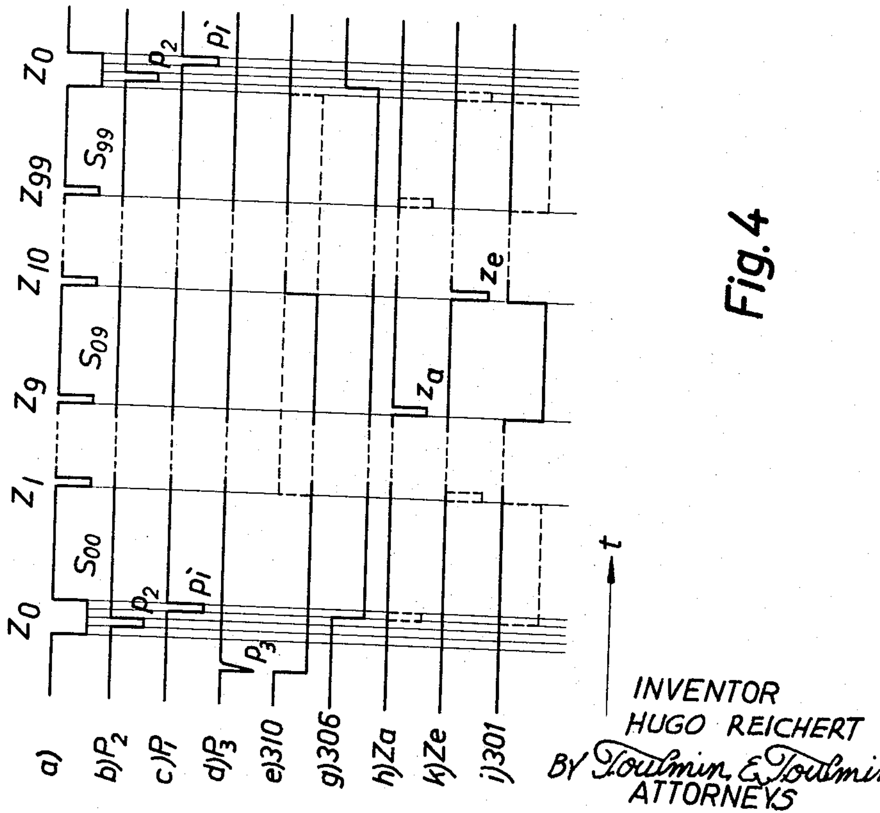
FIGURE 4 is a diagram of the several control trigr and other pulses appearing in the networks illus-ted in the other figures.

Track 318 is also shown in development and may com[prise] of magnetized markers representing the addres[s] section functions and producing pulses *z1*, *z2*, *z3* etc.—see FIG. 4, line *a*. The marker representing junction $J_{[0]}$ is broader and the output pulse *zo* is correspondingl[y] broad. The purpose thereof will be more apparent below[.] The markers on track 318 preferably register with th[e] junctions proper on storage track 305.

It should be mentioned the address sectors $S_{ik}$ hav[e] subscripts corresponding to the address buffer "and" gates $U_{ik}$, the actuation or energization of which mean[s] selection of that address sector with like subscript identi[fi]cation, which subscript pair could be understood a[s] decimal address sector identification code (supra).

In the following, the association of key board and o[f] the several address sectors will be explained in connec[tion] with an example.

Assuming that unit key $Z_0$ and tens-key 9 is bein[g] actuated, now switches $U_9$ and $U_{20}$ apply enabling o[r] gating potential L to "and" gate $U_{09}$. As one can see from FIG. 1, one input terminal each of address selection control "and" gates $a_{19}$ and $a_{20}$ are thus being gated open. When the count of counter 200 reaches stage $C_9$, "and" gate $a_{19}$ responds and applies a pulse to "or" circuit $O_{[1]}$ which, in turn, enters master "and" gate $A_1$. It may be assumed, that flip flop 306 is being turned on and enables gates $A_1$ or $A_2$. Thus, the pulse passes through master "and" gate $A_1$, and appears as "go" pulse at terminal $Z_a$ for turning flip flop 301 on, so that a gating-open o[r] enabling signal is applied to read-out control gate 303 as well as to read-in control gate 303'. Depending upon which one of the latter two control gates is being opened from flip flop 317, transducer head 302 now either reads-in or reads-out. Since stage $C_9$ is being enabled and is associated with the junction $J_9$, address sector $S_{09}$ is being read-in or -out by transducer 302 in that either the "word" stored in address sector $S_{09}$ is permitted to pass through control gate 303 or a "word" composed of read-in bits passes through gate 303' to address sector $S_{09}$ for storage therein.

When junction $J_{10}$ passes under scanner 312, the counter shifts to stage $C_{10}$, and the shifting is correspondingly transmitted through previously enabled "and" gate $a_{20}$, the output of which then feeds one input terminal of "or" circuit $O_2$, which in turn connects to master "and" gate $A_2$. Since flip flop 306 is still open, this pulse passed through gate $A_2$ and appears as "stop" pulse in terminal $Z_e$ to turn flip flop 301 off so that gates 303 and 303' are being blocked again. Since response of stage $C_{10}$ is associated with junction $J_{10}$ as stated, the turning off of "and" gates 303 and 303' occurs after address sector $S_{09}$ did pass completely under scanning head 302.

Thus far, it was assumed, that flip flop 306 is being properly and timely controlled. This will now be described in detail with further reference to FIG. 3.

The first counter stage $C_0$ of counter 200 connects to additional elements. The output at the on-side of flip flop $C_0$ as capacitively drawn therefrom is first fed to a delay line 315 having two output terminal lines $P_1'$ and $P_2$.

Terminal line $P_2$ connects to a monostable flip flop 313 for triggering thereof; monostable flip flop 313 stays in the unstable state for about the duration of the pulse 20 drawn from broad junction $J_0$ by scanner 312. The unble output of monostable flip flop 313 is fed as en- ing signal to an "and" gate 314 to which are also ap- ed directly the counting output pulses of scanner 312. . output of "and" gate 314 appears only when stage has been triggered, and for the duration of the scan- ıg pulse *zo* representing $J_0$. This output is fed to "and" :e $a_1$. "And" gate $a_0$ is directly connected to the output the on-side of stage $C_0$.

It appears that a pulse in terminal line $P_2$ appears be- 'e that in line $P_1'$, but after the counting response of › flop $C_0$ itself. However, the delayed pulse in line $P_1'$ :o appear before termination of the output at "and" gate 4. It appears also that the output of stage $C_0$ is fed im- ›diately to "and" gate $a_0$, but "and" gate $a_1$ receives ›ulse of longer duration after the pulse in terminal line has appeared, and the pulse at "and" gate $a_1$ stays on en after pulse $P_1'$ has already appeared.

It should be added, that for all other counting stages, ; two respective address selection control gates are di- :tly connected thereto, the separation of connection of tes $a_0$ and $a_1$ will become apparent below when the ection of sectors $S_{00}$ and $S_{99}$ will be described.

The two input terminals $P_1$ and $P_2$ of flip flop 306 are nnected as follows: Terminal $P_1$ of the on-side of flip ›p 306 is connected to the output side of a cycle starter ntrol "and" gate 309 having its main input terminal con- cted to the off-side of a flip flop 310. Flip flop 310 has . on-side input terminal connected to a network 308 ich is governed by a switch 307. Closing of switch 307 nstitutes the command signal for read-out or read-in that address sector or sectors preselected for read-out read-in by pressing the appropriate pair (or pairs) of ys (supra).

Network 308 actually constitutes a series circuit con- :ction of an integrating circuit and of a differentiating rcuit producing a needle-shaped trigger pulse $P_3$ ap- ied to the on-side of flip flop 310 thus turning it on, and ereby cycle starter control "and" gate 309 is gated open. \nd" gate 309 has its gating connected to terminal $P_1'$ delay line 315. Thus, the most delayed output pulse delay line 315 is a pulse marking the beginning of a emory drum rotation cycle.

It will be observed that any complete revolution of emory drum 100 completes a cycle and it is entirely bitrary to consider any particular spot on the drum ; the beginning and end of a cycle. For control purposes, ›wever, it is advisable to select one junction as the zero arker which here is done in selecting junction $J_0$ as defin- g cycle and beginning. For control purposes it is further lvantageous to make the storage bit marking $J_0$ broader n direction of memory advance—see arrow) than the :her junctions, so that the corresponding pick up pulse . transducer 312 stays on longer. Thus, passage of junc- on $J_0$ serves not only to produce counting and junction :fining pulses for address selection control "and" gates $_0$ and $A_1$, but also cycle starting and stopping control ılses are being drawn therefrom with the aid of delay ne 315. The pulse drawn therefrom at terminal $P_1'$ serves › turn on flip flop 306 which is necessary to enable master ınd" gates $A_1$ and $A_2$ as aforedescribed.

The flip flop 306 has an off-side input terminal $P_2$ con- ected to delay line 315 for turning this flip flop off still pon passage of junction $J_0$ and after completion of a ıemory drum rotation cycle. The pulse at terminal $P_1'$ ccurs slightly after pulse $P_2$, but both are being produced ›ncurrently with the production of pulse *zo* as afore- escribed.

Finally, flip flop 310 is connected for being turned off y a pulse drawn from the output side of master "and" ate $A_2$, fed first through an "or" circuit so as to enable rbitrary turning off of flip flop 310 via a pulse applied › the second terminal $P_k$ of "or" circuit 311.

The pulse applied to terminal line $P_k$ is drawn from ny suitable source of voltage potential connected there- › temporarily upon commencement of operation so as to ensure that at the beginning flip flop 310 is off indeed.

It is thus apparent that upon passage of junction $J_0$ beneath scanner 312, first a pulse appears in terminal line $P_2$ to turn flip flop 306 off if it was on. If flip flop 306 was off, nothing happens. Slightly thereafter, a pulse appears in terminal line $P_1'$ and is passed through cycle starter control gate 309 only if previously a pulse $P_3$ had turned on the flip flop 310. If such is the case, flip flop 306 will be turned on and master "and" gates $A_1$ and $A_2$ are ready for scanner head control.

A complete operating cycle shall now be described with reference to the pulse diagram of FIG. 4 plotted against time (*t*).

Initially, switch 307 is in open position. All but one of the counter stages are presumed to be in off state. Keys 0 to 9 and $Z_0$ to $Z_9$ are open, no output appears at any "and" gate $U_{ik}$ of the address buffer matrix. Also, no output appears at any of the address selection control "and" gates $a_0$ to $a_{199}$ so that no output is present at any "or" circuit $O_1$, $O_2$. Flip flops 301, 310 and 306 are in "off" state so that control "and" gates 303, 303', starter gate 309 as well as master "and" gates $A_1$ and $A_2$ are closed or blocked.

It now may be assumed that memory drum 100 is started so that the scanners 302 and 312 pick up pulses stored in their respectively scanned tracks. Correspondingly stages $C_0$ to $C_{99}$ are cyclically activated but still no output appears at the output terminals of any of the "and" gates $a_0$ to $a_{199}$. The output pulses from amplifier 304 or from amplifier 304' are respectively suppressed in blocked gates 303 and 303'.

Any pulses at terminal line $P_2$ also remain ineffective because they are being applied to the off side of flip flop 306 which is already in off state. The pulses at terminal $P_1'$ are suppressed in blocked gate 309.

Next, any pair of keys may be pressed to activate any corresponding "and" gate $U_{ik}$. Again, it may be assumed that, for example, keys 9 and $Z_0$ have been pressed, thus activating "and" gate $U_{09}$ which applies gating potential to "and" gates $a_{19}$ and $a_{20}$. Production of one pulse each at the output of "or" circuits $O_1$ and $O_2$ occurs upon passage of junctions $J_9$ and $J_{10}$ and is aforedescribed, but since master "and" gates $A_1$ and $A_2$ are being blocked, still nothing further happens.

It may be assumed further that read-out is desired so that flip flop 317 opens one gating terminal of read-out control "and" gate 303.

At any time now, switch 307 is being closed as command signal for read-out of the "word" in address sector $S_{ik}$ (here $S_{09}$) which was preselected at the key board. Closing of switch 307 results in the production of a pulse $P_3$ (FIG. 4—line *d*) at the output side of network 308 now turning flip flop 310 on (FIG. 4—line *e*), and flip flop 310 gates open the cycle starter control "and" gate 309. Any counting pulses picked up by scanner 312 remain ineffective until junction $J_0$ passes under. First, the resulting counting pulse *zo* (FIG. 4—line *a*) energizes counting stage $C_0$ delivering an output pulse to "and" gate $a_0$ and to delay line 315. When a delayed pulse appears in terminal $P_2$, flip flop 313 immediately responds and opens gate 314 to which was also applied the counting pulse *zo*. It was assumed that neither address selection control gate $a_1$ nor $a_0$ is activated from the key board so that the output of "and" gate 314 remains ineffective.

The delayed pulse drawn from terminal $P_2$ (FIG. 4—line *b*) is fed to flip flop 306, but this pulse remains ineffective because flip flop 306 still is turned off. Slightly thereafter, another pulse is drawn from delay line 315 (FIG. 4—line *c*) and fed to terminal $P_1'$. Since cycle starter control gate 309 was opened upon closing of switch 307, there now appears an output pulse at terminal $P_1$ turning on flip flop 306 (see line *g* in FIG. 4).

The turning on of flip flop 306 effects preparatory opening of the two master gates $A_1$ and $A_2$. Passage of counting pulses 21 to 28 have no effect. Upon passage of junction $J_9$ under scanner 312, flip flop counter stage $C_9$ responds to the counting pulse *z*9 and produces a pulse which passes through the yet open address selection control gate $a_{19}$, through "or" circuit $O_1$, through yet open master "and" gate $A_1$ to terminal $Z_a$ (see also line *h* in FIG. 4) to turn on flip flop 301 (FIG. 4—line *i*) for opening read-out control gate 303. Now the word in address sector $S_{09}$ is read-out and passes through gate 303 to read-out terminal 303*a*.

Upon passage of junction $J_{10}$ under sccanner 312, pulse *z*10 is produced counting stage $C_9$, passes it through yet open address selection control gate $a_{20}$, "or" circuit $O_2$, yet open master "and" gate $A_2$ to terminal $Z_e$ (see also line *k* in FIG. 4), now turning flip flop 301 off (line *i*—FIG. 4), thereby closing read-out control "and" gate 303. Read-out of address sector $S_{09}$ is terminated.

The pulse at master "and" gate $A_2$ is also applied through "or" circuit 311 to flip flop 310 turning it off (FIG. 4—line *e*) so that "and" gate 309 is blocked again. This switching action, however, does not turn off flip flop 306 (FIG.4—line *g*) so that master "and" gates $A_1$ and $A_2$ remain open. This is important, because more than one address sector can be read-out in one cycle. Master "and" gates $A_1$ and $A_2$ remain open until flip flop 306 is turned off, which occurs only at the end of one memory drum cycle by the next pulse at terminal $P_2$. It is thus quite possible to press more than one pair of keys and actually all keys could be pressed for a continuous read-out of the entire track 305.

Upon reappearance of junction $J_0$ under scanner 312 (second pulse *zo* in line *a*, FIG. 4), flip flop $C_0$ responds again and produces a delayed output pulse at terminal $P_2$ (second pulse in line *b*, FIG. 4) which now finds flip flop 306 in the "on" state and shifts it back into "off" state accordingly (see line *g* in FIG. 4), whereupon master "and" gates $A_1$ and $A_2$ close. The next pulse at terminal $P_1'$ (second pulse in line *c*, FIG. 4) finds "and" gate 309 closed because the first pulse appearing at the output of master "and" gate $A_2$ did also turn off flip flop 310 (line *e*—FIG. 4) so as to close "and" gate 309 as aforedescribed.

It is apparent that any further read-out requires a new closing of switch 307.

It now shall briefly be described what happens if keys $OZ_0$ and keys 9 and $Z_9$ have been pressed, and it shall be assumed that address sectors $S_{00}$ and $S_{99}$ are to be read-in. This shall be described with particular reference to the dotted pulses in lines *e, h, k* and *i* of FIG. 4.

Mere pressing of the said four keys has no immediate effect other than that pulses appear at master gates $A_1$ and $A_2$ when the corresponding counter stages $C_{99}$, $C_0$, $C_1$ have responded, but master "and" gates $A_1$ and $A_2$ are closed because flip flop 306 is off.

Now again switch 307 is to be closed causing starter pulse $P_3$ to appear; flip flop 310 is turned on and cycle starting control "and" gate 309 is gated open.

Upon appearance of junction $J_0$ under scanner 312 flip flop $C_0$ responds and immediately a pulse is passed through open "and" gate $a_0$, but this pulse is still blocked at the still closed master "and" gate $A_2$. The delayed pulse at terminal $P_2$ turns on monostable flip flop 313 so that an output appears at "and" gate 314. Since keys O, $Z_0$, 9 and $Z_9$ had been pressed, also "and" gate $a_1$ was being enabled, and the output of "and" gate 314 is thus passed through "and" gate $a_1$ and appears at master "and" gate $A_1$. However, since the cycle just started, flip flop 306 is still off (see line *g* in FIG. 4) and delayed pulse at terminal $P_2$ remains ineffective because flip flop 306 is off. Delayed pulse $p_1'$ however passes through enabled cycle starting control "and" gate 309 and turns on flip flop 306. Master "and" gate $A_1$ is still gated open from "and" gate $a_1$ as passed through "or" circuit $O_1$, because the output of "and" gate 314 stands on for the duration of pulse *zo*, which was assumed to l long enough to also cover completely the delay of dela line 315 (see line *a* in comparison with lines *b* and in FIG. 4).

It should be mentioned that no such elongated pulse needed nor desired for master "and" gate $A_2$ becau: the latter gate controls the turning off of the rea out, and thus should not produce an output when ga: $A_1$ responds. This is the reason why "and" gate $a_0$ directly connected to counter $C_0$ so that "or" circuit C has no output when a cycle starter pulse appears at $P_1$ In other words, the pulse derived from gate $a_0$ is a turn ing off or stop read-in (or read-out) pulse which wi not appear regardless of sector selection prior to th turning on of flip flop 306, though this is done by th same pulse *zo*, the connection is so that the control puls derived from *zo* for gate $a_0$ has already disappeared whe the pulse at $P_1'$ appears to turn on flip flop 306. The situ ation with regard to gate $a_1$, likewise connected to stag $C_0$, is different.

As described, the turning on of flip flop 306 occurs a a time when the *zo* pulse still stands at the input o master "and" gate $A_1$ and flip flop 301 thus is turned o1 thereby (first dotted block in line *i*—FIG. 4) and read-ii of address sector $S_{00}$ commences.

Upon passage of junction $J_1$ under scanner 312 fli flop $C_1$ responds, finds "and" gate $a_2$ open and a puls is passed on through "or" circuit $O_2$ to the now enable master "and" gate $A_2$ (line *k*—FIG. 4, first dotted pulse) turning off flip flop 301 (line *i*—FIG. 4) thus terminatin read-in into address sector $S_{00}$.

Whether other keys than those mentioned are presse shall be disregarded because the events follow as afore described with reference to read-out of address secto $S_{09}$.

Finally, junction $J_{99}$ appears beneath scanner 312 and pulse $Z_{99}$ turns on stage $C_{99}$ which finds "and" gate $a_{199}$ open ($U_{99}$ was gated open by keys 9 and $Z_9$), and a pulse passes through "or" circuit $O_1$, master "and" gate $A_1$ (second dotted pulse in line *h*—FIG. 4) to turn on flip flop 301 and read-in of address sector $S_{99}$ starts (second dotted block in line *i*—FIG. 4). Upon reappearance of junction $J_0$ under scanner 312, there is first the immediate response of stage $C_0$ passed on to "and" gate $A_0$ and transmitted further through "or" circuit $O_2$, master "and" gate $A_2$ (second dotted pulse in line *k*—FIG. 4) to turn off flip flop 301 to terminate read-out of address sector $S_{99}$. The delayed response (delay line 315) of monostable flip flop 313 and the resulting response of "and" gate 314 and transmission thereof through "and" gate $a_1$ to "or" circuit $O_1$ and master "and" gate $A_1$ remains ineffective because the delayed pulse from line 315 as derived from terminal $P_2$ has in the meantime turned off flip flop 306 (line *g*—FIG. 4) thus terminating this cycle.

It is apparent that, for example, for read-out, at read-out terminal 303*a* one can have the contents ("words") of several address sectors in any selection and in any succession as desired.

If, for example, the "word" in address $S_{00}$ is to be added to the "word" in address $S_{99}$, the succession is immaterial, and both key pairs O, $Z_0$ and 9, $Z_9$ can be pressed simultaneously as aforedescribed, whereupon switch 307 is closed and the content of the two addresses appears at read-out terminal 303*a*. When the succession is important, only one key pair at a time is pressed and switch 307 closed and reclosed after the content of the respective address has appeared at terminal 303. Read-in into several sectors is carried out accordingly, and read-in and read-out can be changed over in that prior to any reclosing of switch 307 flip flop 317 is triggered for initiating the change-over from read-in to read-out or vice-versa.

In FIG. 2 there is shown a modification of the buffer matrix $U_{ik}$ in that there are half as many keys $T_1$, . . . $T_{100}$ as there are "and" gates $a_0$ to $a_{199}$ so : respective two of such "and" gates $a_i$ can be conted directly to a gating potential by means of one $T_i$. This modification, however, might prove cumberle in that it increases the number of keys. In case of a ıll number of sectors, however, it might be simpler to : assign a key to a sector so as to eliminate the fer "and" gates.

.ooking again at the buffer matrix $U_{ik}$ in FIG. 1, will be observed that storage of an input signal is l in energizing a line wire and a column wire by way actuating one of the switches $U_0$ to $U_9$ and one of switches $U_{20}$ to $U_{29}$. It is apparent that these switches ı be substituted by electronic switches, for example, ı flops. These flip flops can be triggered by pulses for ring address code in accordance with an instruction o buffer matrix.

These trigger pulses for selecting an address sector for ıd-out may be derived from an instruction decoder so ıt the matrix $U_{ik}$ actually constitutes an address regis- as temporary storage element in a large data procsing unit. Also, the address code fed to matrix $U_{ik}$ ıy be drawn from a permanent instruction memory. It is further apparent that switch 307 may be an elecınic switch so that the sequence of storage of address des into the buffer as well as the triggering of pulses may be done in accordance with an instruction drawn ɔm a decoder which, in turn, was charged by a key ıard.

As memory device one cannot only use drums, but scs, or a closed-loop tape. Also, magnetic storage is ınvenient, but not essential, and other modes of storage .n be used and controlled.

Electronic components such as flip flops, "and" gates, ɔr" circuits, counter stages and counters including those : the shrift register type are, for example, illustrated ıd described in Robert Steven Ledley's "Digital Comıter and Control Engineering," McGraw-Hill, 1960; .eith Henney's "Radio Engineering Handbook," Mcıraw-Hill, 1959; R. K. Richards' "Digital Computer," 'an Nostrand; and others.

The invention is not limited to the embodiments de:ribed above but all changes and modifications thereof ot constituting departures from the spirit and scope of ıe invention are intended to be covered by the followıg claims.

What is claimed is:

1. An address sector selecting device for cyclically perable memories of data processing systems, with each wo adjoining address sectors having a common junction, here being controllable scanning means for address read-ı and/or read-out, the combination comprising: a pluality of individually activatible storage elements each ıeing respectively associated with an address sector; a irst and a second "and" gate for each storage element, ach having one input terminal connected to the output ıf said each storage element; a first and a second "or" :ircuit having its input terminals connected to the respecive output terminals of all said first and all said second 'and" gates, respectively; means connected to said first 'or" circuit for producing an enabling pulse for address sector scanning means interaction; means connected to said second "or" circuit for producing a disabling pulse for address sector scanning means interaction; and means responsive to the passage of address sector junctions under said scanning means and producing distinguishing junction representing pulses, with each such pulse being fed to one of said first "and" gates and one of said "second" gates pertaining to storage elements, associated address sectors having a common junction.

2. An address sector selecting device for rotating memories of data processing systems, with each two adjoining address sectors having a common junction, there being controllable scanning means for address read-in and/or read-out, the combination comprising: an array of "and" circuits, each having two input terminals, one thereof being connected to a column wire, the other one to a line wire; switching means for selectively connecting any line wire and any column wire to a source of enabling voltage potential; a first and a second "and" gate for each "and" circuit, each "and" gate having one input terminal connected to the output of said each "and" circuit; a first and a second "or" circuit having its input terminals connected to the respective output terminals of all said first and all said second "and" gates, respectively; means connected to said first "or" circuits for producing an enabling pulse for address sector scanning means interaction; means connected to said second "or" circuit for producing a disabling pulse for address sector scanning means interaction; and means responsive to the passage of address sector junctions under said scanning means and producing distinguishing junction representing pulses, with each such pulse being fed to one of said first "and" gates and one of said "second" gates pertaining to "and" circuits associated with adjoining address sectors having a common junction.

3. An address sector selecting device for rotating memories of data processing systems, with each two adjoining address sectors having a common junction, there being controllable scanning means for address read-in and/or read-out, the combination comprising: a plurality of individually activatable storage elements each being respectively associated with an address sector; a first and a second "and" gate for each storage element, each having one input terminal connected to the output of said each storage element; a first and a second "or" circuit having its input terminals connected to the respective output terminals of all said first and all said second "and" gates respectively; a first and a second master "and" gate, each having a main input terminal respectively connected to the output terminals of said first and second "or" circuits; a flip flop connected for controlling the gating terminals of said master "and" gates; means connected to be responsive to the output of said first master "and" gate for turning on address sector scanning means interaction; means connected to be responsive to the output of said second master "and" gate for turning off address sector scanning means interaction; and means responsive to the passage of address sector junctions under said scanning means and producing distinguishing junction representing pulses, with each such pulse being fed to one of said first "and" gates and one of said "second" gates pertaining to storage elements associated with adjoining address sectors having a common junction.

4. An address sector selecting device for rotating memories of data processing systems with each two adjoining address sectors having a common junction, there being controllable scanning means for address read-in and/or read-out, the combination comprising: a plurality of individually activatable switches respectively associated with said address sectors; a first and a second "and" gate for each said switches and being connected thereto to receive enabling potential therefrom; a first and a second "or" circuit having its input terminals connected to the respective output terminals of all said first and all said second "and" gates respectively; means connected to said first "or" circuit for producing an enabling pulse for address sector scanning means interaction; means connected to said second "or" circuit for producing a disabling pulse for address sector scanning means interaction; and means responsive to the passage of address sector junctions under said scanning means and producing distinguishing junction representing pulses, with each such pulse being fed to one of said first "and" gates and one of said second "and" gates pertaining to storage elements associated with adjoining address sectors having a common junction.

5. An address sector selecting device for rotating memories of data processing systems, with each two adjoining address sectors having a common junction, the combination comprising: a plurality of individually activatable storage elements each being respectively associated with an address sector; a first and a second "and" gate for each storage element, each having one input terminal connected to the output of said each storage element; a first and a second "or" circuit having its input terminals connected to the respective output terminals of all said first and all said second "and" gates, respectively; a first and a second master "and" gate, each having a main input terminal respectively connected to the output terminals of said first and second "or" circuits; a flip flop connected to be turned on from said first master "and" gate and to be turned off from said second master "and" gate; a transducer head interacting with said memory and being controlled by said flip flop; and means responsive to the passage of address sector junctions and producing distinguishing junction representing pulses, with each such pulse being fed to one of said first "and" gates, and one of said "second" gates pertaining to storage elements associated with adjoining storage elements having a common junction.

6. An address sector selecting device for rotating memories of data processing systems, with each two adjoining address sectors having a common junction, there being scanning means for address read-in and/or read-out, the combination comprising: a plurality of individually activatable storage elements each being respectively associated with an address sector; a first and a second "and" gate for each storage element, each having one input terminal connected to the output of said each storage element; a first and a second "or" circuit having its input terminals connected to the respective output terminals of all said first and all said second "and" gates, respectively; a first and a second master "and" gate, each having a main input terminal respectively connected to the output terminals of said first and second "or" circuits; a flip flop connected to the gating terminals of said master "and" gates; switching means for turning on said flip flop for enabling said master "and" gates; means connected to be responsive to the output of said first master "and" gate for turning on address sector scanning means interaction; means connected to be responsive to the output of said second master "and" gate for turning off address scanning means interaction; and means responsive to the passage of address sector junctions under said scanning means and producing distinguishing junction representing pulses, with each such pulse being fed to one of said first "and" gates and one of said "second" gates pertaining to storage elements associated with adjoining address sectors having a common junction.

7. An address sector selecting device for cyclically operable memories of data processing systems, with each two adjoining address sectors having a common junction, there being scanning means for address read-in and/or read-out, the combination comprising: a plurality of dividually activatable storage elements each being resp tively associated with an address sector; a first and a s ond "and" gate for each storage element, each having c input terminal connected to the output of said each stora element; a first and a second "or" circuit having its inp terminals connected to the respective output terminals all said first and all said second "and" gates, respective a first and a second master "and" gate, each having a ma input terminal which is connected to the output termin of said first and second "or" circuits, respectively; a f flop connected to the gating terminals of said mast "and" gates; means responsive to the passage of sa memory through a complete cycle for controlling sa flip flop; means connected to be responsive to the outp of said first master "and" gate for turning on address se tor scanning means interaction; means connected to responsive to the output of said second master "and" ga for turning off address sector scanning means interactio and means responsive to the passage of address sect junctions under said scanning means and producing di tinguishing junction representing pulses, with each suc pulse being fed to one of said first "and" gates and or of said "second" gates pertaining to storage elements a sociated with adjoining address sectors having a commc junction.

8. An address sector selecting device for cyclicall operable memories of data processing systems, with eac two adjoining address sectors having a common junctio there being scanning means for address read-in and/c read-out, the combination comprising: an address cod storage matrix including a plurality of individually ene gizable storage elements individually associated with ac dress sectors; a pair of address selection control gate connected to each of said storage elements; means fo cyclically enabling respectively two of said address selec tion control gates respectively connected to two storag elements associated with adjoining address sectors; sai gates being arranged in two groups of similar numbe with none of the gates of any one group being connecte to the same storage elements or being cyclically enable simultaneously; and means to draw distinct stop and g control signals from said two groups for controlling ad dress sector scanning means interaction.

References Cited

UNITED STATES PATENTS

| | | | |
|---|---|---|---|
| 2,901,735 | 8/1959 | Lawrence -------- | 340—174.1 |
| 3,231,869 | 1/1966 | Hill et al. --------- | 340—174.1 |

BERNARD KONICK, *Primary Examiner.*

A. I. NEUSTADT, *Assistant Examiner.*